(12) United States Patent
Carlson et al.

(10) Patent No.: US 6,807,590 B1
(45) Date of Patent: *Oct. 19, 2004

(54) DISCONNECTING A DEVICE ON A CACHE LINE BOUNDARY IN RESPONSE TO A WRITE COMMAND

(75) Inventors: Jeff M. Carlson, Cypress, TX (US); Ryan A. Callison, Spring, TX (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/542,157

(22) Filed: Apr. 4, 2000

(51) Int. Cl.$^7$ ............................................. G06F 13/14
(52) U.S. Cl. ......................... 710/57; 710/129; 709/25; 713/224
(58) Field of Search ....................... 710/57, 62, 129; 709/25; 713/224

(56) References Cited

U.S. PATENT DOCUMENTS

| | | | |
|---|---|---|---|
| 5,586,248 A | | 12/1996 | Alexander et al. |
| 5,623,625 A | | 4/1997 | Thompson et al. |
| 5,692,200 A | | 11/1997 | Carlson et al. |
| 5,717,870 A | * | 2/1998 | Dobson ....................... 395/250 |
| 5,717,954 A | * | 2/1998 | Grieff et al. ................... 710/57 |
| 5,809,280 A | | 9/1998 | Chard et al. |
| 6,148,350 A | * | 11/2000 | Chen et al. .................... 710/62 |
| 6,298,407 B1 | * | 10/2001 | Davis et al. ................. 710/129 |

OTHER PUBLICATIONS

PCI Local Bus, PCI–to–PCI Bridge Architecture Specification, Revision 1.1, Dec. 18, 1998, p. 35.*
Intel ® 21050 PCI–to–PCI Bridge Evaluation Board User's Guide, Sep. 1998, © Intel Corporation 1998, pp. i–vi, 1–1—3–2.
PCI Local Bus Specification, Revision 2.2, Dec. 1998, © 1992, 1993, 1995, 1998 PCI Special Interest Group, pp. i–ii, 47–49, 198.
PCI Local Bus, PCI–to–PCI Bridge Architecture Specification, Revision 1.1, Dec. 1998, © 1994, 1998, PCI Special Interest Group, pp. 1–2, 11–13, 46–47, 57–66, 69–70.
PCI Local Bus, PCI–X Addendum to the PCI Local Bus Specification, Revision 1.0, Sep. 1999, © 1999 PCI Special Interest Group, pp. 1–2, 34–37, 40–41, 93–95, 146–147.
PCI Special Interest Group, "PCI Local Bus Specification, Revision 2.2," pp. i–ii, 52–61 (Dec. 1998).

* cited by examiner

Primary Examiner—Abdelmoniem Elamin

(57) ABSTRACT

Efficient bus operations is provided by maintaining alignment with cache line boundaries in response to a write command. A write buffer in a bridge device receives data from any one of a multiple number of bus interfaces. Write buffer management is utilized to monitor on a continuous basis the amount of free space available in the write buffer. When the data in the write buffer approaches the capacity of the write buffer, the system prepares for a potential disconnect of the write initiating device from the bridge device. Data alignment with cache line boundaries is maintained upon disconnect by adjusting the available free space in the write buffer to equal a multiple of a cache line amount of data. The write initiating device is disconnected when the data in the write buffer equals a write buffer full status.

19 Claims, 7 Drawing Sheets

32-BYTE CACHE-LINE

| STARTING ADDRESS | LOCATION IN CACHE LINE |
|---|---|
| 0x00 | 1 |
| 0x04 | 2 |
| 0x08 | 3 |
| 0x0c | 4 |
| 0x10 | 5 |
| 0x14 | 6 |
| 0x18 | 7 |
| 0x1c | 8 |

64-BYTE CACHE-LINE

| STARTING ADDRESS | LOCATION IN CACHE LINE |
|---|---|
| 0x00 | 1 |
| 0x04 | 2 |
| 0x08 | 3 |
| 0x0c | 4 |
| 0x10 | 5 |
| 0x14 | 6 |
| 0x18 | 7 |
| 0x1c | 8 |
| 0x20 | 9 |
| 0x24 | 10 |
| 0x28 | 11 |
| 0x2c | 12 |
| 0x30 | 13 |
| 0x3d | 14 |
| 0x3S | 15 |
| 0x3c | 16 |

FIG. 6A

MAX_TRANSFER_COUNT=ADJUSTED_FREE_SPACE-START_LOCATION

1. ADJUSTED_FREE_SPACE=0x13 & 0xF8=0x10 DWORDS

2. START_LOCATION=START_ADDRESS[4:2]=000b=0.

3. MAX_TRANSFER_COUNT=0x10-0x00=<u>0x10 DWORDS</u>

FIG. 6B

MAX_TRANSFER_COUNT=ADJUSTED_FREE_SPACE-START_LOCATION

1. ADJUSTED_FREE_SPACE=0x13 & 0xF8=0x10 DWORDS

2. START_LOCATION=START_ADDRESS[4:2]=010b=2.

3. MAX_TRANSFER_COUNT=0x10-0x02=<u>0x0E DWORDS</u>

FIG. 6C

DISCONNECTING A DEVICE ON A CACHE LINE BOUNDARY IN RESPONSE TO A WRITE COMMAND

RELATED APPLICATIONS

This application is related to concurrently filed, and commonly assigned U.S. Patent Applications which are hereby incorporated by reference as if set forth in their entirety:

U.S. patent application Ser. No. 09/542,760, filed on Apr. 4, 2000, now U.S. Pat. No. 6,370,616, entitled MEMORY INTERFACE CONTROLLER FOR DATUM RAID OPERATIONS WITH A DATUM MULTIPLIER, filed concurrently by Ryan A. Callison, Christopher Garza, Albert H. Chang, and Hubert E. Brinkmann, Jr.;

U.S. patent application Ser. No. 09/542,624, filed on Apr. 4, 2000, now U.S. Pat. No. 6,370,611, entitled RAID XOR OPERATIONS TO SYNCHRONOUS DRAM USING A READ BUFFER, filed concurrently by Ryan A. Callison, William C. Galloway, Christopher Garza, and Albert H. Chang;

U.S. patent application Ser. No. 09/542,309, filed on Apr. 4, 2000, still pending, entitled DYNAMIC ROUTING OF DATA ACROSS MULTIPLE DATA PATHS FROM A SOURCE CONTROLLER TO A DESTINATION CONTROLLER, filed concurrently by Hubert E. Brinkmann, Jr. and Ryan A. Callison;

U.S. patent application Ser. No. 09/542,969, filed on Apr. 4, 2000, still pending, entitled PROVIDING DATA IN RESPONSE TO A READ COMMAND THAT MAINTAINS CACHE-LINE ALIGNMENT, filed concurrently by Jeff M. Carlson and Ryan A. Callison; and U.S. patent application Ser. No. 09/542,420, filed on Apr. 4, 2000, still pending, entitled DYNAMIC REMAPPING OF ADDRESS REGISTERS FOR ADDRESS TRANSLATION BETWEEN MULTIPLE BUSSES, filed concurrently by Hubert E. Brinkmann, Jr. and Ryan A. Callison.

BACKGROUND OF THE INVENTION

1. Field of the Invention

The invention relates to bridge devices in multicontroller computer applications, and more particularly, to improving bus utilization efficiency during data transfer operations among the system controllers.

2. Description of the Related Art

Inclusion of multiple microcontroller devices within a single application specific integrated circuit (ASIC) has become common place. As the size of ASIC computer chips decrease and system speeds increase, system efficiency is scrutinized at every level. Communications among the multiple controllers in a system or on an ASIC present one part of the larger computer system efficiently that ultimately affects overall system speed. Data transfer, including read and write operations to system memory and even among the ASIC controllers, are required to be efficient or risk choking overall system speeds as devices wait for bus operations to catch up to internal processes. To make matters more complex, the various controllers and the system memory often reside on multiple computer communications buses. As such, bridge-type devices have become a common component to facilitate data transfers among the different bus interfaces. However, "dumb" bridges serve to introduce additional latencies without efficiency improvement.

For many reasons, maintaining alignment with cache line boundaries has become important to improve efficiencies. For example, memory controllers are generally more efficient in responding to write operations when they operate on cache line boundaries (i.e. receive data in amounts equal to a cache line and aligned with its cache boundaries). In addition, the Peripheral Component Interconnect (PCI) computer bus standard requires certain bus management techniques regarding cache line amounts of data. For example, PCI provides for at least two types of write operations: memory write (MW) and memory write invalidate (MWI). However, these operations require entire cache line operations or multiples thereof. One approach for operating on a cache-line basis has involved preconfiguring all system write operations to occur on a cache-line multiple basis. Such configuration, however, has ignored certain device limitations such as buffering capabilities. Specifically, where the rate of incoming data flow exceeds the rate of outgoing data, buffer capacity can be exceeded causing a forced disconnect of the write initiating device. Other common situations are prone to cause cache line misalignment. One situation is where the write initiating device begins at a cache line boundary. If the amount of receiving buffer space available is not a multiple of the cache line size, then the write initiating device may be disconnected at some point in the middle of the write operation irrespective of cache line alignment. A second situation exists where the write initiating device will begin a write operation at a non-aligned address, but transfer an amount of data that is a multiple of a cache line size. In this situation, because the write operation has completed, the write initiating device will then be disconnected, leaving the end data written in between cache line boundaries.

SUMMARY OF THE INVENTION

The bridge device according to the present invention maintains cache line alignment during write operations between the bridged devices. Specifically, after a write command is issued by a device, the device continues to write to a write buffer until the capacity of the write buffer approaches a full capacity. As the data in the buffer accumulates to ward a full capacity, an additional amount of write data is calculated based on the space available in the write buffer, the starting address of the write operation and the cache line such that the write initiating device is disconnected with its write data ending on a cache line boundary in memory.

BRIEF DESCRIPTION OF THE DRAWINGS

A better understanding of the present invention can be obtained when the following detailed description of the preferred embodiment is considered in conjunction with the following drawings, in which:

FIGS. 6A–6C are examples of cache line alignment calculations in accordance with the present invention.

DETAILED DESCRIPTION OF THE PREFERRED EMBODIMENT

Figure 1:
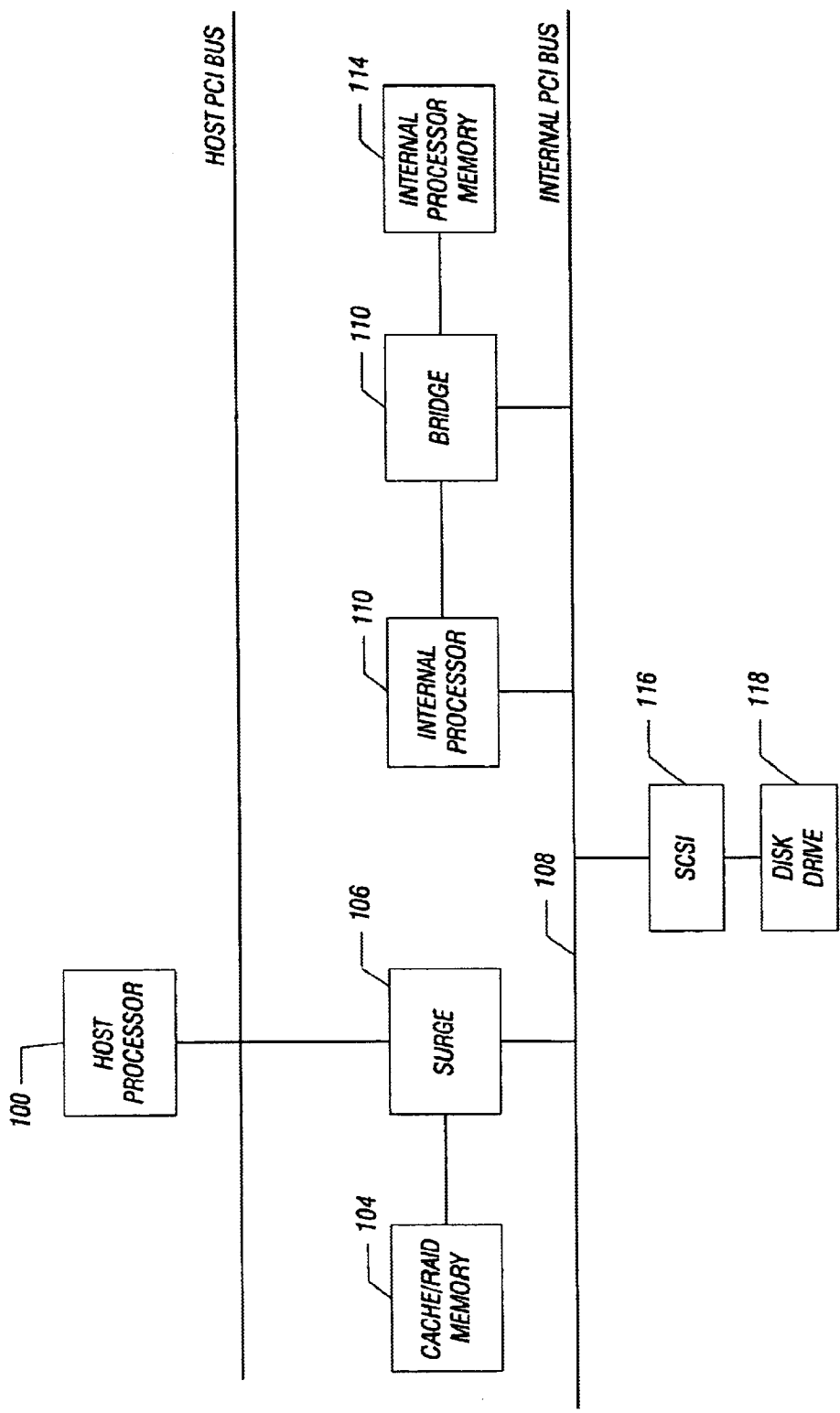
FIG. 1 is a block diagram of the computer system having a bus interface device in accordance with the present invention.

Referring now to FIG. 1, a block diagram of a disk subsystem 101 is shown. A Host Processor 100 is connected to a host PCI (Peripheral Component Interconnect) bus 102, which provides a communications channel to other components of a host computer system (not shown). The disk controller 101 also includes an internal PCI bus 108, which, like the host PCI bus 102, includes a control portion and a multiplexed address and data portion. Both buses 102 and 108 are capable of 66 MHz and 64-bit operation. For a description of the PCI bus standard, refer to *PCI Specification, Revision* 2.2, (December 1998), Intel Corporation of Santa Clara, Calif., which is hereby incorporated by reference as if set forth in its entirety.

Coupled to the internal PCI bus 108 is an internal or local processor 110 that controls the functions of the devices coupled to the internal PCI bus 108, for example. The Internal Processor 110 is coupled to a Internal Processor memory 114. Both the Internal Processor 110 and the Internal Processor memory 114 are coupled through a processor PCI bridge 112 to the internal PCI bus 108. The Internal Processor 110 executes firmware stored in the Internal Processor memory 114 to perform various disk controller functions.

The processor PCI bridge 112 can be implemented with an ASIC. Further, the processor PCI bridge 112 can include logic for converting processor memory or I/O cycles into PCI cycles, and as well can include processor-to-PCI write posting buffers. The processor-PCI bridge 112 also can include a memory controller for controlling operations to the Internal Processor memory 114. Additionally, interval timers and an interrupt controller are included in the processor-PCI bridge 112.

Also connected to the internal PCI bus 108 is at least one SCSI controller 116 for interfacing with a disk drive 118. Multiple SCSI controllers and associated disk drives may be added to create a disk array subsystem.

Transactions between the host PCI bus 102 and the internal PCI bus 108 are bridged by a bus/memory interface device 106. The bus/memory interface device 106 has at least two modes of operation. In one mode, the bus/memory interface device 106 operates as a "pass-through" or PCI-to-PCI bridge device, directly passing transactions between the host PCI bus 102 and the internal PCI bus 108. The bus/memory interface device 106 also operates in a non-bridge mode, whereby transactions between the host PCI bus 102 and the internal PCI bus 108 are first translated by the bus/memory interface device 106 before being sent to their destination.

In the non-bridge mode, the bus/memory interface device 106 provides address and data translation between two or more bus interfaces, specifically between buses having non-matching address spaces. Where a conflict exists between an address in the address space for the Internal Processor 110 or the internal PCI bus 108 and an address in the address space for the Host Processor 100 or the host PCI bus 102, the bus/memory interface device 106, in the non-bridge mode, remaps the incoming transaction and translates the address originating from the originating bus into a different, but corresponding, outgoing address within the address space of the receiving or destination bus. Additionally, the bus/memory interface device 106 performs its address translations in a bi-directional manner. For example, a request issued by the Host Processor 100 passes from the host PCI bus 102 in the host PCI address space to the bus/memory interface device 106. The incoming address is then translated to the appropriate corresponding address within the address space of the internal PCI bus 108. Likewise, the Internal Processor 110 communicates with the Host Processor 100 by issuing a request in its internal PCI bus address space to the bus/memory interface device 106 where the request is translated to a corresponding address within the address space for the host PCI bus 102. Conventional PCI bridges have performed address translation.

The translation task is performed by the bus/memory interface device 106 using a system of internal programmable translation registers. The translation registers may be programmed on a per access basis by any device involved in a particular transaction. This allows all translations to occur between differing address spaces, dynamically, at a run-time level. For example, a first transaction may be initiated by a device instructing the bus/memory interface device 106 to configure its translation registers in a certain manner to allow a first translation between a first set of address spaces. The translation for that particular transaction is performed according to that configuration. A second transaction which requires translation between a second set of address spaces, different from the first set, is initiated when the requesting device instructs the bus/memory interface device 106 to reconfigure the translation registers to allow for the second transaction. In this way, a run-time change in communications among various bus interfaces is handled by dynamically reconfiguring the translation registers in the appropriate manner. Dynamic reconfiguration will be discussed below in more detail.

Here a memory storage device 104 is provided as a third interface to the bus/memory interface device 106. Here again, the bus/memory interface device 106 operates in either a bridge mode, merely passing transactions directly to the memory device 104 over the memory bus 130, or in a non-bridge or I2O mode, where requests from either the host PCI bus 102 or the internal PCI bus 108 are translated into the memory space of the memory device 104. The memory device 104 may be used either for cache memory operations and/or for RAID memory operations. While PCI I/O cycles are forwarded from the host PCI bus 102 to the internal PCI bus 108 for the bridge mode, PCI I/O cycles are not claimed by the internal PCI bus 108 in the non-bridge mode. Instead, a PCI I/O in the bus/memory interface device 106 window is opened so that the Host Processor 100 can communicate with the local processor 110.

Providing cache memory off of the bus/memory interface device 106 allows for efficient internal bus utilization through increased cache bandwidth, simultaneous host PCI bus and internal PCI bus memory operations and optimized control of bus performance. In addition, both RAID and cache operations share the same memory.

The bus/memory interface device 106 is therefore capable of operating between any number of bus interfaces. Furthermore, the bus/memory interface device 106 performs the translation function in a multi-directional manner. Therefore any request originating from any interface may be dynamically translated to the appropriate address within the address space for any other destination bus interface.

Any number of bus/memory interface devices 106 and the accompanying memory device 104 may be included in a system to create an external array architecture. The advantages of multiple bus interface devices include considerably increased cache capacity, thereby increasing memory bandwidth and increased data throughput via multiple data passages. The bus/memory interface device 106 in such a multi-device architecture provides automatic routing of command or data information among and between the various communication devices and memory via pre-specified address ranges.

Figure 2:
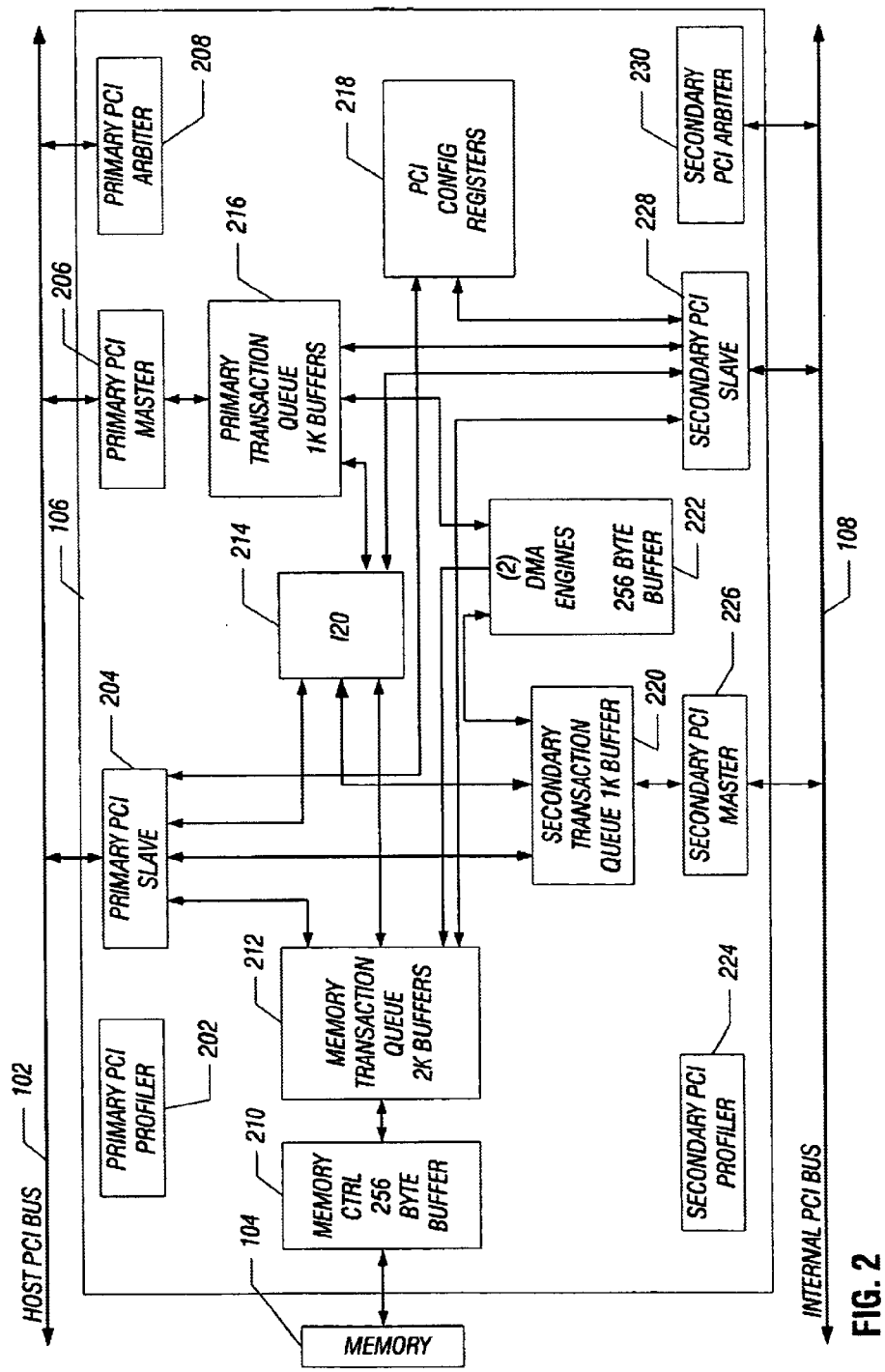
FIG. 2 is a block diagram of the internal components of the bus interface device of FIG. 1 in accordance with present invention.

Referring now to FIG. 2, a more detailed block diagram of the bus/memory interface device 106 is shown. The bus/memory interface device 106 connects to three external interfaces: the Host PCI Bus 102, the Secondary PCI Bus 108 and the Memory Bus 130. Each of the bus interfaces 102, 108 and 130 represents a different address space for the bus/memory interface device 106. The two DMA Engines 222 and the I2O control block 214 reference each bus interface as independent memory maps. Each memory space is encoded within the data structures of the DMA Engines 222 and then specified to the I2O Control Block 214 via configuration registers within the set of PCI Configuration Registers 218.

The two DMA Engines 222 are used for the automatic transfer of data for caching operations and for high speed execution of RAID operations, for example XOR functions. Each engine is capable of moving data among the three memory spaces for the host PCI bus 102, the secondary PCI bus 108 and the memory bus 130. To carry out the task of moving data between the memory spaces, the two DMA Engines 222 interface with three Transaction Queues, each transaction queue associated with one of the three bus interfaces. Therefore, the DMA Engines 222 interface with the host PCI bus 102 via the host PCI transaction queue 216. The DMA Engines 222 interface with the internal or secondary PCI bus 108 via the secondary PCI transaction queue 220. Finally, the DMA Engines 222 interface with the Memory bus 130 via the Memory transaction queue 212.

The data structures for each of the three memory maps which are encoded within the DMA Engines 222 are also utilized by the I2O Control Block 214. The I2O Control Block 214 provides a means for the host Processor 100, the Internal Processor 110 or other input/output processor (IOP) located on the Secondary PCI bus 108 to communicate by passing inbound and outbound messages in message frames. The I2O Control Block 214 supports the industry standard interface defined in the Intelligent I/O Architecture (I2O) Specification, v 1.5, which is hereby incorporated by reference as if set forth in its entirety. Like the DMA Engines 222, the I2O Control Block 214 also interfaces with each of the three Transaction Queues 212, 216 and 220 to provide communication among and between the Host PCI Bus 102, the Secondary PCI Bus 108 and the Memory Bus 130. The I2O Control Block 214 operates in one of two modes: push and pull. In the I2O push model, the Host processor 100 writes a message frame to be communicated directly into the IOP's local memory. In the I2O pull model, the Host processor 100 writes the message frame to be communicated into host memory and allows the bus/memory interface device's 106 DMA engines 222 to copy the message frame from host memory to the IOP memory. The I2O Control Block 214 is further connected to the Host PCI Bus 102 and the Secondary PCI bus 108 via the PCI Slaves 204 and 228, respectively.

The PCI Slaves 204 and 228 provide access gateways among the Host PCI Bus 102 and the secondary PCI Bus 108 as well as to the Transaction Queues 212, 216 and 220 of the other interfaces. The PCI Slaves 204 and 228 also conduct priority decoding of transactions having conflicting address ranges.

The PCI master devices 206 and 226 provide the primary PCI functions for the bus/memory interface device 106 and are effectively compliant with the 2.1 revision of the PCI Specification. PCI Masters 206 and 226 control all transfers to their respective bus. Each PCI Master communicates with its associated transaction queue to determine the timing of the data transfers. Specifically, the Host PCI Master 206 requests control of the Host PCI Bus 102 when the appropriate amount of data is available in the Host PCI Transaction Queue 216. Likewise the Secondary PCI Master 226 requests control of the Secondary PCI Bus 108 when the Secondary PCI Transaction Queue 220 contains the appropriate amount of data. Each PCI Master is likewise capable of maintaining cache-line boundaries for read operations and each PCI slave is capable of maintaining cache-line boundaries for write operations. Maintaining cache-line boundaries for all transactions optimizes bus utilization by the bus/memory interface device 106.

As described above, the Transaction Queues 212, 216 and 220 provide the bridging mechanism between the different bus interfaces. There are three Transaction Queues, each dedicated to one of the three bus interfaces. The Host Transaction Queue 216 bridges transactions and operations to the Host PCI Master 206 onto the Host PCI Bus 102. The Secondary PCI Transaction Queue 220 bridges transactions to the Secondary PCI Master 226 onto the secondary PCI Bus 108. Finally, the Memory Transaction Queue 212 bridges memory accesses to the Memory Controller 210 and the SDRAM Memory 104. Certain of the Transaction Queues also communicate directly between the two PCI Slaves 204 and 228, the I2O control block 214 and the two DMA Engines 222.

In carrying out its function of bridging each of the bus interfaces, the Transaction Queues perform various sub-functions. First, all PCI master operations can be initiated by the associated transaction queue. The appropriate transaction queue sends a start pulse and all necessary transaction information in order to enable the PCI master to initiate a transaction. In addition, the Transaction Queues perform conflict resolutions among conflicting access requests. Each respective transaction queue determines which requesting source has access using a predetermined priority scheme. A higher priority request is given immediate access to the queue while lower priority request are held and retried for later acceptance. The Transaction Queues are also capable of determining how much data to pre-fetch for certain types of accesses from system devices which have known characteristics. Finally, the memory transaction queue 212 controls memory access requests to and from the SDRAM 104 by sending read and/or write instructions for the memory controller 210 to execute.

The PCI Profilers 202 and 224 are used to determine the amount of data that the transaction queue should pre-fetch for certain transactions on a per device basis. The transaction queue receives a selected profile for each transaction from its associated profiler.

The primary function of the Memory Controller 210 is to service memory requests from the Memory Transaction Queue 212. Specifically, the Memory Controller 210 translates instructions from the Memory Transaction Queue 212 into the proper format of read and/or write requests. The bus/memory interface device 106 supports all SDRAM architectures of varying density and speed by having registers define the number of row and column address bits and certain delay parameters.

Implemented within the bus/memory interface device 106 can be a data protection scheme for RAID (redundant array of inexpensive drives) systems which provides a technique of allowing the system to experience multi-drive failures. Specifically, a multiplier is provided in connection with the Memory Transaction Queue 212 to extend the capabilities of typical RAID operations. RAID operations using a multiplier are described in detail in a commonly-assigned U.S. Patent Application, entitled MEMORY INTERFACE CONTROLLER FOR DATUM RAID OPERATIONS WITH A DATUM MULTIPLIER, previously incorporated herein by reference.

All transactions over the Host PCI Bus 102 and the Secondary PCI Bus 108 communicating with the bus/memory interface device 106 are prioritized according to an arbitration algorithm compliant with the PCI Specification, 2.1 revision. The arbitration algorithm is controlled in the Host PCI Arbiter 208 and the Secondary PCI Arbiter 230.

The architectures shown in FIGS. 1 and 2 and described herein are merely illustrative and not exhaustive. It should be noted that any number of different specific architectures may be employed without departing from the present invention.

The bus/memory interface device 106 can be used for internal controller or external controller applications. For the internal controller application, the bus/memory interface device 106 is used as a bridge between a host PCI bus and an internal PCI bus. With the bus/memory interface device 106, data can be routed from an internal I/O controller coupled to a disk drive to an internal PCI bus, from the internal PCI bus to a cache memory, and from the cache memory to a host PCI bus which communicates with a host. The internal I/O controller can for example be a Fibre Channel controller or a SCSI controller. While in an internal controller application the bus/memory interface device 106 provides bridging functions to a host, in an external array controller application the bus/memory interface device 106 can provide other bridging functions such as bridging to a variety of I/O controllers and even to other bus/memory interface devices 106. Alternatively, in an external tape controller application, the bus/memory interface device 106 can be used primarily for interfacing a tape controller to a cache memory in connection with error code correction. A variety of internal and external controller applications using the bus/memory interface device 106 may be employed without departing from the present invention.

Figure 3:
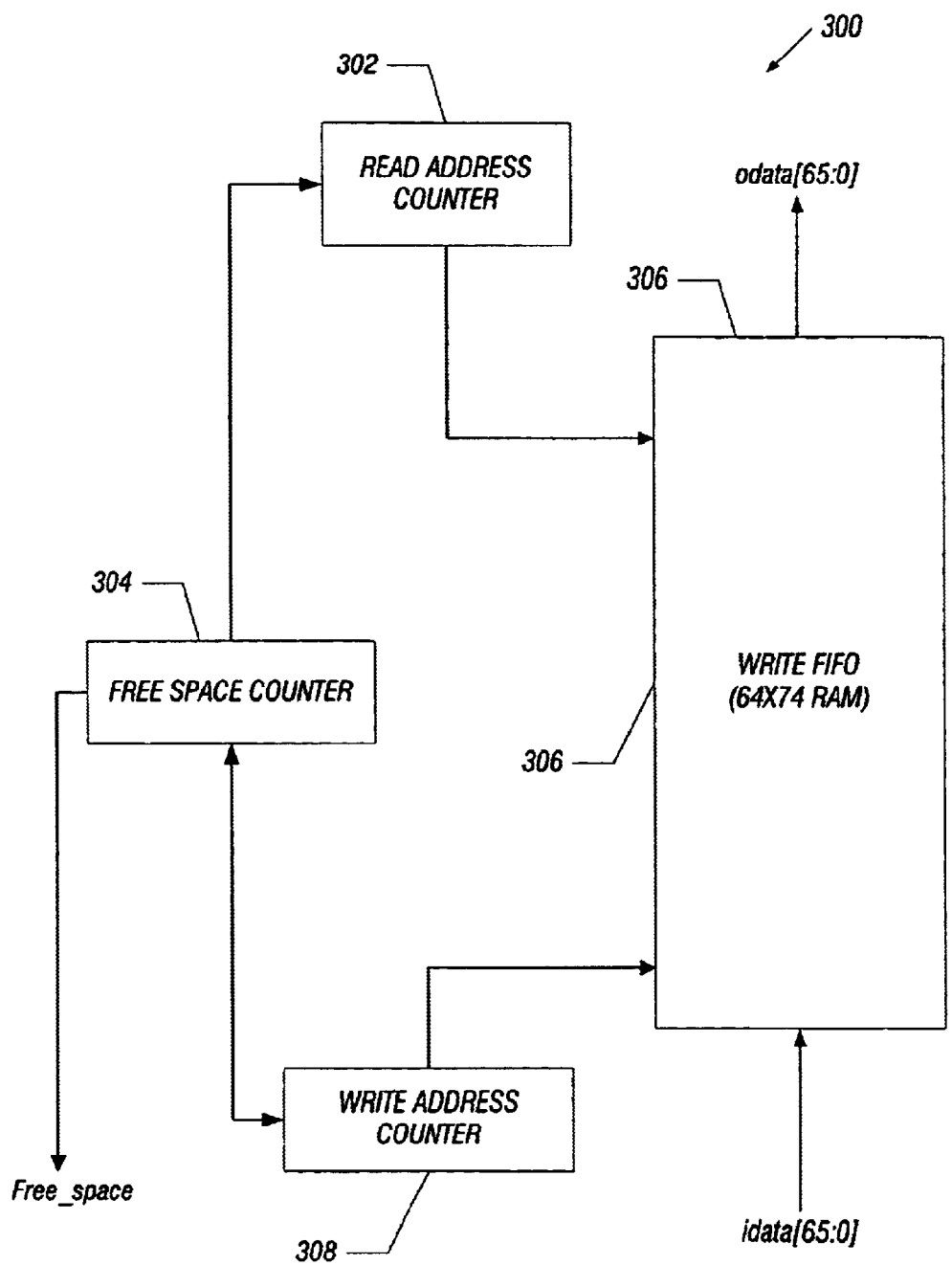
FIG. 3 is a block diagram of the internal components of the transaction queue of FIG. 2.

Referring now to FIG. 3, illustrated is a more detailed block diagram of a schematic for maintaining cache line alignment upon disconnecting a device in response to a write command. As illustrated, the buffer circuitry 300 is found internal to either the primary transaction queue 216, the secondary transaction queue 220 or the memory transaction queue 212 depending upon the location of the source of the initiating master device. For example, a write command initiated from host processor 100 is received over the host PCI bus 102 by the primary PCI slave 204 into the secondary transaction queue 220 or the memory transaction queue 212. Data can be written from one PCI interface to the other PCI interface or to the SDRAM interface. The incoming data, idata [65:0] enters the write FIFO 306. According to one embodiment, the write FIFO buffer (first in, first out) 306 is a 64×74 byte random access memory (RAM). The nature of the disclosed subject matter allows for varying sizes of FIFO buffers. Specifically, by monitoring the available space in the write FIFO 306, cache line alignment may be maintained upon device disconnect for even smaller than normal buffers. The cache-line alignment technique prevents a writing device from being disconnected at a cache-line boundary due to the write FIFO 306 becoming full during the course of a write transaction. By maintaining cache line alignment, a writing device is able to utilize the more efficient MWI command rather than the MW command. Cache line alignment is a PCI requirement when issuing MWI commands. In addition, although a very large buffer may be used with very little space management, the disclosed techniques provide utilization of a reduced size buffer, as will be discussed in more detail below.

The write FIFO 306 is a first-in first-out buffer outputting data, odata [65:0], as new data is written. The status of the write FIFO 306 is monitored using a write address counter 308 and a read address counter 302. The device writing to the write FIFO 306 uses the writing address associated with the write address counter 308, and the device reading the write FIFO 306 uses the reading address associated with the read address counter 302. A free space counter 304 strobes the read address counter 302 and the write address counter 308 to determine the absolute value of the write address minus the read address. The free space counter 304 thus determines the amount of space available in the write FIFO 306. The free_space signal from the free space counter 304 is used to determine when write FIFO management must be initiated to prevent a forced device disconnect at a non-cache line boundary. A cache-line alignment module through software or an alignment engine polls the free-space signal at the beginning of each write command.

It should be understood that the exemplary buffer management circuit shown in FIG. 3 is illustrative and not exhaustive. For example, those skilled in the art will readily appreciate that the technique to determine the amount of unused capacity in the buffer can be varied without departing from the spirit of the present invention. In an alternative buffer management circuit embodiment, for example, a trigger signal can be used to alert a buffer full status.

Figure 4:
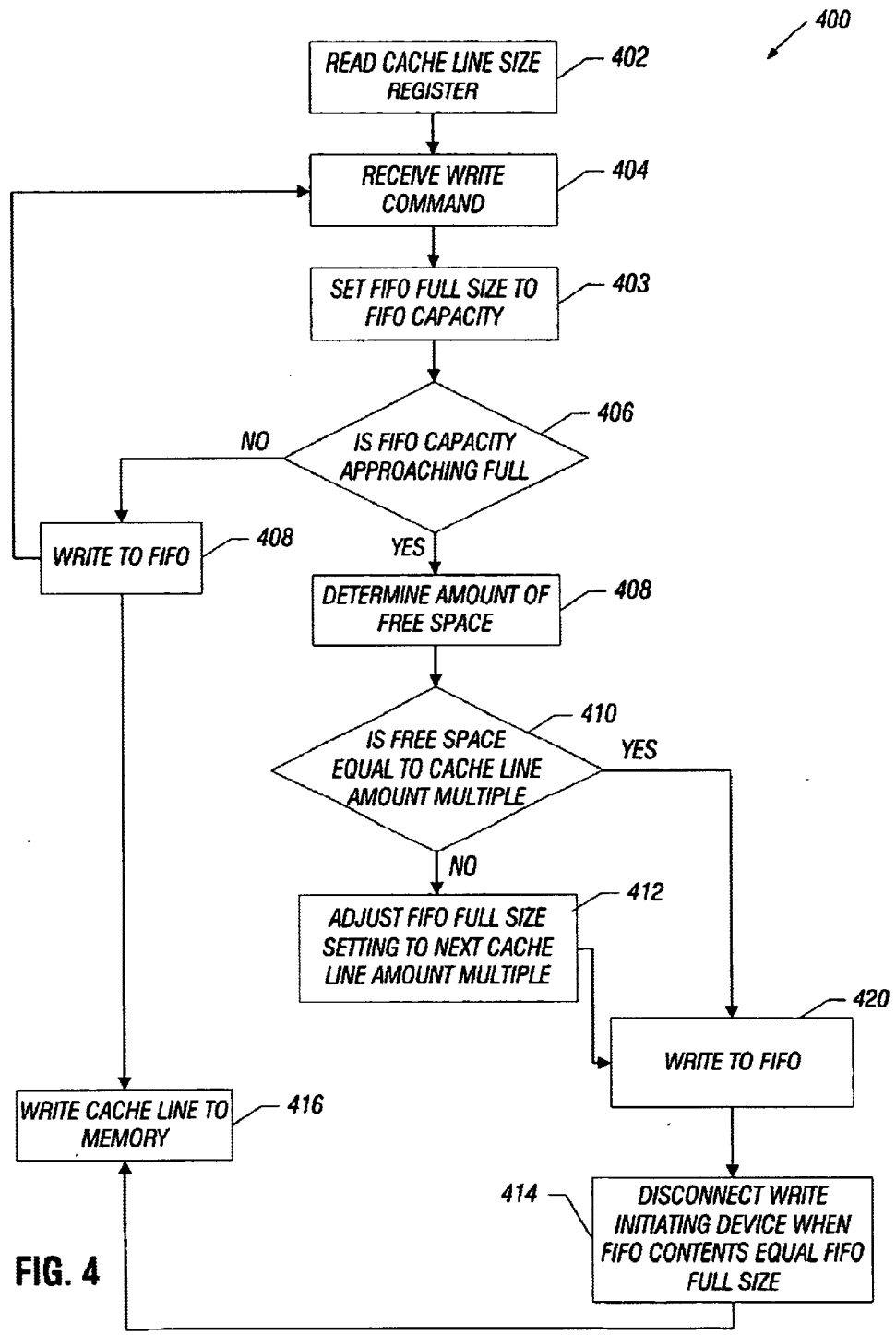
FIG. 4 is a flow diagram for device disconnect at a cache line boundary.

Turning now to FIG. 4, shown is the flow diagram for implementing the device disconnect FIFO management that maintains cache line alignment upon disconnect of a write initiating master device. Beginning at step 402, a cache-line alignment module associated with the appropriate transaction queue 212, 216 or 220, reads the cache line size register (CLSIZE) to determine the mode of operation as set in configuration. According to a disclosed embodiment, the cache line size may be selectably configured for either 32 or 64 bytes. The CLSIZE register is found in standard PCI configuration space. At step 404, the PCI slave 204 decodes a write command from, in this example, the host PCI bus 102. It should be understood that a write command initiated by any device in the system will initiate the disclosed cache line alignment mode of operation disclosed herein. It should also be understood that alternative components such as an alignment engine could be programmed and used to perform the functions of cache line alignment and master device disconnect.

Continuing at step 403, a FIFO full size value is set equal the capacity of the write FIFO 306. At step 406, the free-space signal is polled to determine the status of the write FIFO 306, specifically whether the contents of the write FIFO 306 is approaching a full capacity or FIFO full size. It should be understood that the FIFO full size indicator is a programmable full size for the FIFO 306. If not, at step 408, the data is written to the FIFO and control is returned to step 404 where the system waits to receive an additional write command. At the same time, at step 416, the data from the write FIFO 306 is written to its destination, either in memory 104 or to another interface such as the internal PCI bus 108.

If the contents of the write FIFO 306 are approaching a full capacity, at step 408, the cache-line alignment module determines the amount of free space available in the write FIFO 306 from signal free_space. The cache-line alignment module then determines at step 410 whether the amount of free space is equal to a cache line amount multiple. For example, if the cache line size is 64 bytes and the free space is 128 bytes, then the free space is a multiple of the cache line size. Where the contents of the write FIFO 306 is approaching a full capacity and the amount of free space is not a cache line amount multiple, the cache-line alignment module, at step 412, adjusts the FIFO full size setting to equal the next cache line amount multiple. At step 414, the PCI slave 204 or 228 disconnects the write command initiating master from the bridge interface when the write FIFO 306 contents are equal to the FIFO full size setting. In this way, buffer capacity is sacrificed to disconnect on a cache line boundary. Thereafter, the data written to the FIFO 306 is sent to the appropriate interface at step 416.

Figure 5:
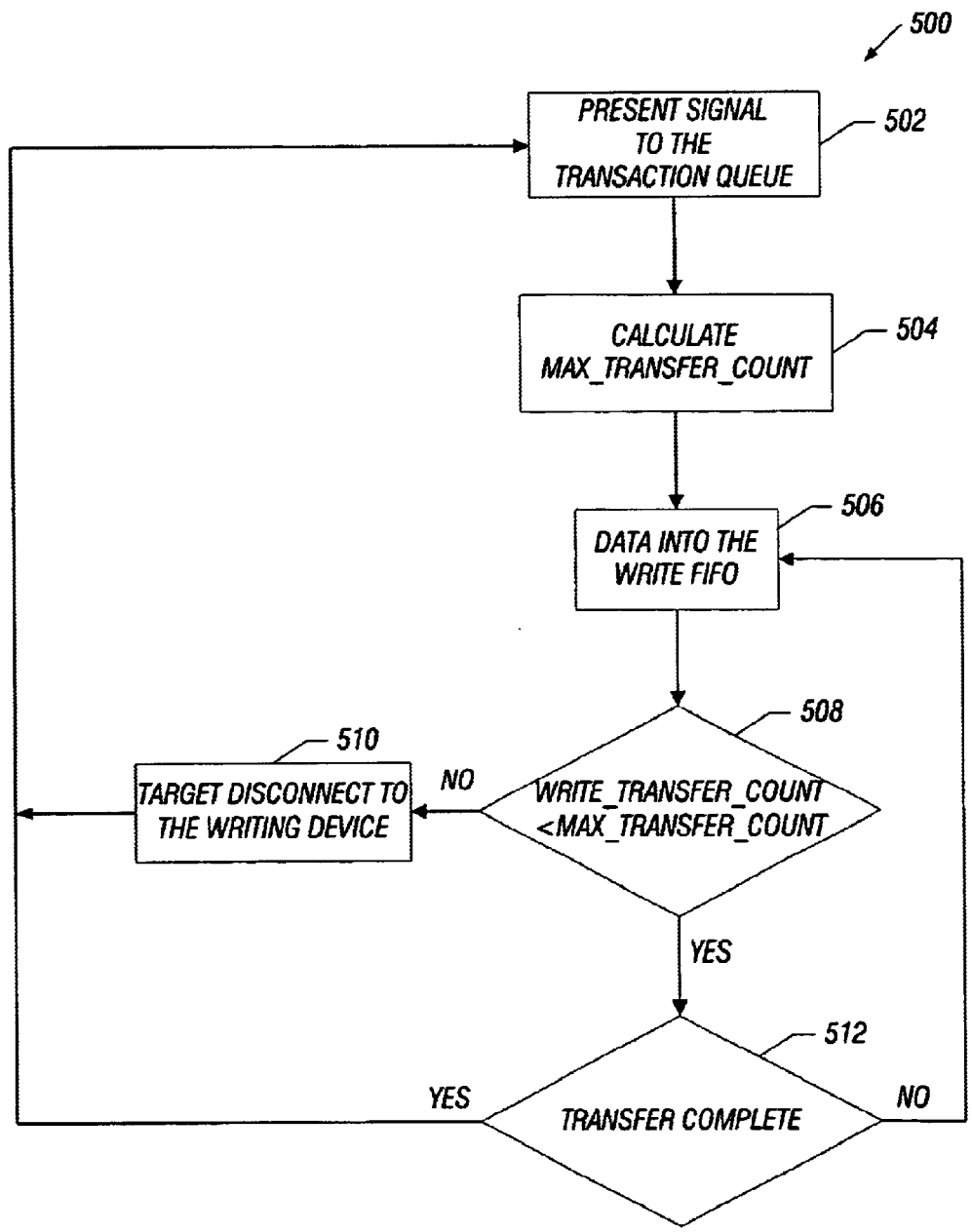
FIG. 5 is a more detailed flow diagram of FIG. 4.

Turning now to FIG. 5, shown is a more detailed flow diagram illustrating the interaction between the PCI slave devices 204 or 228 and the respective transaction queues 212, 216, or 220. After write command has been received at step 404, the PCI slave 204 or 228 decodes the write command and presents the transaction request signal to the appropriate transaction queue at step 502. The transaction queue then computes the maximum amount data that can be transferred into the FIFO 306 while maintaining cache-line alignment. This Max_Transfer_Count is communicated to the appropriate PCI slave with a transaction acknowledge signal at step 504. Calculation of the Max_Transfer_Count value is discussed in more detail in connection with FIGS. 6A–6C. Proceeding to step 506, the PCI slave 204 or 228 transfers data into the write FIFO 306.

Once the data transfer has begun, the PCI slave 204 or 228 determines when to disconnect the writing device by comparing the Write_Transfer_Count, indicating the amount of data to be written, to the calculated Max_Transfer_Count at step 508. If the amount to be written is less than the calculated maximum space in the FIFO 306, the writing device maintains connection with bridge device 106. In step 512, data continues to be written to the FIFO 306 until the transfer is complete at step 512, where control returns to step 502 and the system waits for a receipt of a subsequent write command. However, once the writing device has transferred an amount data equal to the Max_Transfer_Count, the PCI slave will issue a disconnect to the writing device to terminate the transfer to step 510.

Turning now to FIGS. 6A–6C, shown are examples of cache-line alignment calculation according to the disclosed technique. The alignment algorithm uses the starting address (Start_Address) of the write command, the amount of free space in the write FIFO 306 (free_space), and the cache-line size (CLSIZE) from the cache-line size register in order to calculate the maximum amount of data that can be written into the write FIFO 306 while maintaining cache-line alignment. This calculated value is communicated to the PCI slave 204 or 228 at the start of a write command as the maximum transfer count (Max_Transfer_Count). According to one embodiment, a first step in calculating the Max_Transfer_Count value is to adjust the Free_Space value to a multiple of the cache-line size. Thus, the value represented by the free_space signal must be adjusted to a multiple of the cache-line size by subtracting any amount representing only a partial cache-line. One technique to achieve this result requires replacing the lower three bits of the Free_Space values with zeros for the case of a 32 byte cache-line. For a 64 byte cache-line size, the lower four bits of the free-space value is set to zero. Anything other than a zero in these identified lower bytes, identifies less than a full 32 byte or 64 cache-line size.

The next step involves determining the location within a cache-line at which the transaction will begin (Start_Location). This can be determined by examining the lower bits of the starting address. For a 32 byte cache-line size, bits 4:2 of the starting address indicate which dword within the cache-line at which the transaction will begin. FIG. 6A indicates the starting dword locations within a cache-line for both a 32 byte cache-line and a 64 byte cache-line. As is shown, a 32-byte cache line contains eight dwords while a 64-byte cache line contains 16 dwords. For example if the starting address is 0x14h, bits 4:2 indicate that the transaction will begin at the $6^{th}$ dword within a cache-line. The Max_Transfer_Count value is then obtained by subtracting the starting location (Start_Location) from the Adjusted_Free_Space.

Turning to FIG. 6B, shown is a cache-line alignment calculation example for a write transaction beginning at an address of 0x20h with a transfer count of 0x20h, or 32 dwords. The transfer count is the amount of data to be written during the write operation. Thus, according to the first example of FIG. 6B, the Adjusted Free_Space value is determined by replacing with zero values the lower bits of the Free_Space value of 0x13h from the free_space signal. Because the cache-line size is set to 32 bytes in this example, the lower three bits are set to zero resulting in a value of 0x10h, or 16 dwords or 64 bytes. Continuing, the Start_Location value is determined from the start address at 0x20h. The value of bits 4:2 of the Start_Address is zero or 000b indicating that the write address begins at the cache-line boundary. The Max_Transfer_Count value is determined by subtracting the Start_Location at cache-line boundary, or 0x00h, from the Adjusted_Free_Space value 0x10h. Thus, 16 dwords or 2 cache-lines may be written into the FIFO 306 before the PCI slave needs to disconnect the writing device in order to maintain cache-line alignment on disconnect. When the writing device request the bus again to complete the remainder of the 32 dword transfer, the Starting_Address will again be aligned to a cache-line boundary allowing the write device to issue a MWI command. If the writing device was allowed to continue without disconnect, a forced disconnect would occur upon its next write. Because less than one full cache line is available, the forced disconnect would occur misaligned with a cache-line boundary.

Turning now to FIG. 6C, shown is a second example for cache-line alignment according to one embodiment. FIG. 6C illustrates a write transaction that begins at address 0x28h for a transfer count of 0x20h, or 32 dwords. The free_space signal indicates a value of 0x13h, or 19 dwords, as available space in the write FIFO 306. The cache-line size is set in the CLSIZE register as 32 bytes. The Adjusted_Free_Space value is determined as in the example above, by the setting lower bits to zero. In this case, since the cache-line is set at 32 bytes, the lower three bits of the Free_Space value are set to zero resulting in 0x10h, or 16 dwords, as the Adjusted_Free_Space value. From this example, one can see that although 19 dwords can be received by the FIFO 306 without exceeding capacity, the actual amount that is considered by the alignment module is the Adjusted_Free_Space amount or 16 dwords.

Continuing, the Start_Location value is determined by taking the value of bits 4:2 of the Start_Address, resulting in a value of 010b or two dwords. Thus, unlike the example above, in this example the writing device is initially misaligned with a cache-line boundary by two dwords. The Max_Transfer_Count value is then calculated by subtracting the Start_Location of two dwords from the Adjusted_Free_Space of the write FIFO 306, resulting in a value of 0x0Eh or 14 dwords. Thus, in this example, only 14 dwords may be written into the FIFO 306 before the PCI slave needs to disconnect the writing device in order to cause the writing device to become aligned on a cache-line boundary at disconnect. When the writing device requests the bus again to complete the remainder of the 32 dword transfer, the Start_Address will then be aligned to a cache-line boundary allowing the writing device to issue an MWI command.

It should be understood that various aspects of the calculation for Max_Transfer_Count may be performed using different techniques requiring only minor modifications to the foregoing disclosures. For example, it should be noted that an alternative embodiment would be to subtract the Starting_Location from the write FIFO Free_Space first, and then adjust that result to a multiple of the cache-line size. The result remains the same as the above examples while the number of necessary calculations is reduced.

Thus, since the FIFO full size has either been adjusted to equal a cache line multiple or is equal to a cache line multiple without adjustment, the device will be disconnected, if needed, at a cache line boundary maintaining the preferred cache line alignment. This improves PCI bus efficiency by allowing a writing device to use the MWI command rather than the MW command, thereby improving bus efficiency. In this way, PCI requirements are maintained and memory and bus utilization is maximized by establishing a communication protocol on a cache line data basis.

The foregoing disclosure and description of various embodiments are illustrative and explanatory thereof, and various changes in the architecture, controllers, busses, data paths, caches, addressing, commands, circuitry, components and order of process steps, as well as in the details of the illustrated software and hardware and construction and method of operation may be made without departing from the scope of the invention.

What is claimed is:

1. A method for processing write commands from a device in a computer system, comprising the steps of:
   detecting a write command from a computer device, thereby initiating a write operation;
   receiving data in a buffer in response to the write command;
   monitoring the status of the buffer to determine the amount of data in the buffer; and
   disconnecting the computer device to terminate the write operation when the buffer reaches a buffer full status such that the write operation is terminated when the data is aligned with a cache line boundary.

2. The method of claim 1, the disconnecting step further comprising the steps of:
   configuring the buffer full status to equal a capacity of the buffer when unused buffer capacity equals a multiple of a cache line of data; and
   configuring the buffer full status to equal a level of buffer capacity less than a total buffer capacity.

3. The method of claim 2, wherein the level of buffer capacity less than the total buffer capacity is equal to an additional cache line of data calculated from the last data written to the buffer.

4. The method of claim 2, wherein calculation of the level of buffer capacity less than the total buffer capacity comprises the steps of:
   calculating an adjusted buffer capacity by rounding down the buffer capacity to a multiple of a cache line size; and
   substracting from the adjusted buffer capacity a portion of a starting write address.

5. The method of claim 1, the monitoring step further comprising the steps of:
   calculating an amount of unused buffer capacity by substracting an absolute difference between a buffer reading address and a buffer writing address from the total buffer capacity.

6. A computer bridge device for performing computer write operations between multiple systems, comprising:
   a receiving device for receiving write commands from a system device;
   a buffer coupled to the receiving device, the buffer having a buffer capacity; and
   a means for disconnecting the receiving device from the system device to terminate a write operation when the buffer approaches a buffer full status such that the write operation is terminated when data in the buffer is aligned with a cache line boundary.

7. The computer bridge device of claim 6, further comprising:
   a means for measuring a status of the buffer to determine an amount of data in the buffer.

8. The computer bridge device of claim 6, further comprising:
   a means for detecting a cache line size.

9. The computer bridge device of claim 8, further comprising:
   a means for determining if unused capacity of the buffer is a multiple of the cache line size.

10. The computer bridge device of claim 8, further comprising:
    a means for adjusting the buffer full status such that an unused capacity of the buffer is a multiple of the cache line size.

11. A computer system for performing computer write operations, comprising:
    a system device; and
    a bridge coupled to the system device, the bridge comprising:
       a receiving device for receiving write commands from a system device;
       a buffer coupled to the receiving device, the buffer having a buffer capacity;
       a means for disconnecting the receiving device from the system device to terminate a write operation when the buffer approaches a buffer full status such that the write operation is terminated when data in the buffer is aligned with a cache line boundary.

12. The computer system of claim 11, the bridge, further comprising:
    a means for measuring a status of the buffer to determine an amount of data in the buffer.

13. The computer system of claim 11, the bridge, further comprising:
    a means for detecting a cache line size.

14. The computer system of claim 13, the bridge, further comprising:
    a means for determining if unused capacity of the buffer is a multiple of the cache line size.

15. The computer system of claim 13, the bridge, further comprising:
    a means for adjusting the buffer full status such that an unused capacity of the buffer is a multiple of the cache line size.

16. A method for performing computer write operations, the method comprising the steps of:

detecting a write command, thereby initiating a write operation;

receiving data in response to the write command;

calculating an amount of received data responsive to the write command for disconnection of the write operation when the amount of the received date is aligned with a cache line boundary.

17. The method of claim 16, wherein the calculation step is performed by an alignment engine, the alignment engine causing a write command initiating device to be disconnected from a receiving data buffer when the received data is aligned with a cache line boundary.

18. The method of claim 16, the step of calculating the amount of received data, comprising the steps of:

adjusting an amount of available capacity to receive additional data;

calculating a start location within a cache-line from a starting address of the write command; and calculating a maximum write transfer value by subtracting the start location from the adjusted amount of available capacity.

19. The method of claim 18, wherein the step of adjusting an amount of available capacity comprises calculating an adjusted free space value from an actual free space value representing an actual capacity of the receiving buffer.

* * * * *